July 18, 1950

E. T. KALEN ET AL 2,515,516

AUTOMATIC SAFETY SHUT-OFF VALVE

Filed April 20, 1948

INVENTOR.
EDWIN T. KALEN
FRANK B. SCOFIELD

BY

ATTORNEY

July 18, 1950     E. T. KALEN ET AL     2,515,516
AUTOMATIC SAFETY SHUT-OFF VALVE
Filed April 20, 1948     2 Sheets-Sheet 2
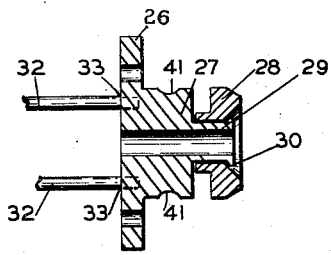
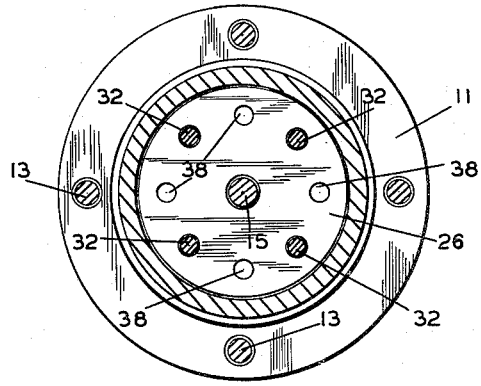
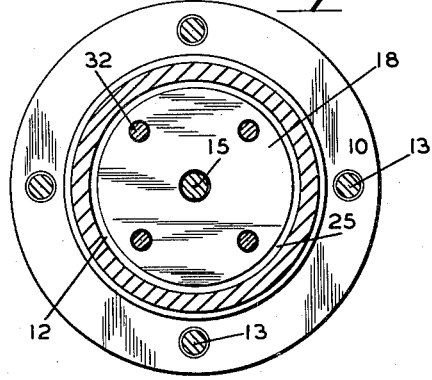
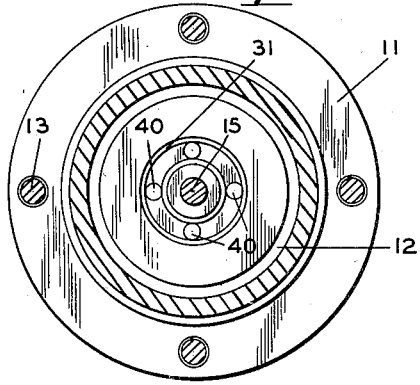
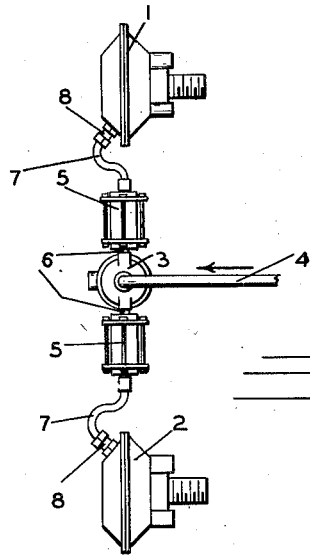
INVENTOR.
EDWIN T. KALEN
FRANK B SCOFIELD
BY
ATTORNEY Patented July 18, 1950

2,515,516

UNITED STATES PATENT OFFICE 2,515,516

AUTOMATIC SAFETY SHUT-OFF VALVE

Edwin T. Kalen and Frank B. Scofield,
Eugene, Oreg.

Application April 20, 1948, Serial No. 22,034

12 Claims. (Cl. 303—84)

This invention relates to automatic safety shut off valves for air brake systems, and is particularly adapted for air brakes used on vehicles.

In the operation of air brake systems on vehicles and the like, heretofore when a fracture occurred in a line leading to one of the brake diaphragms the complete braking system was rendered ineffective. When one of the lines became fractured leading to one of the brake diaphragms the air escaped through this broken line from the other individual brake diaphragms rendering the brake system inoperative.

The primary object of our invention is to provide an automatic safety shut off valve for shutting off the escape of air through the fractured line above mentioned.

A further object of our invention is to provide an automatic shut off valve that cannot be reset until the fracture has been repaired.

In the carrying out of the objects of our invention, in the event one of the brake air lines are fractured this particular line is shut off automatically so that the balance of the brakes can be operated under normal conditions until the fractured line is repaired and the shut off valve reset.

A further object of our invention is the provision of adjusting means for adjusting the automatic shut off valve to the working pressure of the brake system of the particular vehicle to which the same is attached.

In the carrying out of the objects of our invention the air passing through our automatic shut off valve in the normal operation of the brakes causes a piston to float within the valve, said piston being adjusted to the operating pressure of the system so that the piston will have no effect on the shut off valve feature where the brake diaphragms are offering normal back pressure when applying the brakes.

When a fracture occurs between our safety shut off and one of the brake diaphragms the above mentioned piston encounters no back pressure from said brake diaphragm. When no resistance is being offered to the movement of the piston by the applied air application it will continue to move until engaging a secondary piston which will immediately close the exit port of the shut off valve preventing further escape of air.

When the said exit port is closed, the same will be held closed positively until the valve has been reset after the fracture in the line has been repaired.

A more complete and detailed explanation will be apparent on referring to the drawings, specification and claims.

Referring to the drawings:

Figure 4 is a sectional detail view of the shut off valve and secondary piston assembly.

Figure 5 is an end sectional view taken on line 5—5 of Figure 2 illustrating the exit port.

Figure 6 is a sectional view taken on line 6—6 of Figure 1 looking into the secondary piston associated with the shut off valve.

Figure 7 is an end view of the valve assembly taken on line 7—7 of Figure 1 looking into the floating piston.

Figure 8 is a diagrammatical hook up of the quick release valve together with our automatic safety shut off valve as associated with the brake diaphragms.

Referring more specifically to the drawings:

Referring to Figure 8, the conventional brake diaphragms are indicated at 1 and 2. The standard quick release valve 3 receives its air supply through the line 4 leading from the brake control valve not here shown. We have not attempted to illustrate any other parts of the vehicle outside of the brake diaphragms and the quick release valve.

Our safety control valves 5 are indicated connected to the quick release valve 3 at 6 and to the flexible air lines 7, which in turn are connected to the brake diaphragms 1 and 2 at 8.

Figure 1:
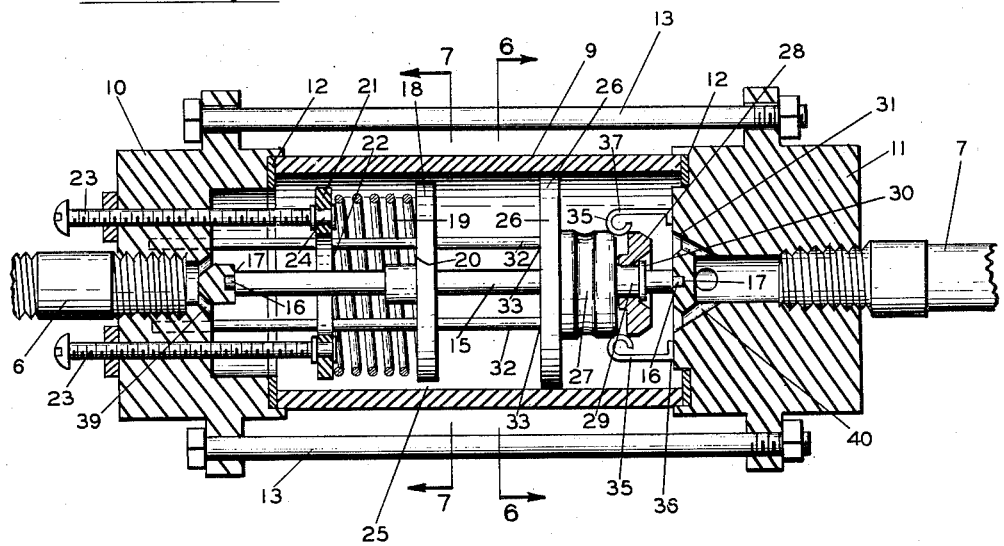
Figure 1 is a cross sectional view of our new and improved automatic air safety shut off valve illustrating the valve in open and operating position.

Referring to Figure 1, our new and improved safety shut off valve consists of a cylinder 9 mounted between cylinder heads 10 and 11 through the gaskets 12 by the tie-rods 13. The cylinder head 10 is the intake end of the valve while the cylinder head 11 is the exit end of the valve. The intake end of the valve is connected to the quick release valve of the truck through the nipple 6, while the exit end of the valve is connected to the flexible air lines 7 leading to the brake diaphragms of the vehicle.

A guide member or rod 15 is mounted between the cylinder heads 10 and 11 by having its reduced ends 16 supported within sockets 17 formed within the cylinder heads. Slidably mounted on the rod 15 is a primary floating piston 18. The position of this piston is controlled by the spring 19 which is fixedly secured to the piston at 20 at its one end, and to the adjusting ring 21 at 22 at its opposite end.

The position of the adjusting ring 21 is determined by the adjusting screws 23 which are threaded through the cylinder head 10 and are loosely connected to their inner ends at 24 to the adjusting ring 21. The object and purpose of the adjusting screws and adjusting ring 21 is to adjust the operation of the shut off valve for the particular installation and air pressure to which the same is to be associated with. Further explanation will follow. It will be noted that a definite clearance 25 exists between the piston 18 and the cylinder 9. The object of which will be more fully described later.

A secondary piston 26 is slidably mounted on the guide rod 15 and has a reduced portion 27 terminating in a floating valve disc 28. The valve disc 28 is mounted to the extended nipple 29 which is peened over at 30 to hold the said disc in place. The object of mounting the valve disc loosely to the nipple 29 is to insure accurate seating of the same. The valve disc 28 is adapted to seat on the valve seat 31 when a fracture takes place between our shut off valve and the brake diaphragm.

Rods 32 are fixedly mounted at 33 to the piston 26 at their one end and slidably mounted within guide holes 34 within the piston head 10 at their opposite end. The object of the rods 32 is to limit the movement of the piston 26 towards the piston 18 when the brakes are released, more fully described later.

A working fit is maintained between the piston 26 and the cylinder 9 and the piston is held in the position shown in Figure 1 by the spring locks 35 which are fixedly secured to the cylinder head 11 at 36 and having their outer ends 37 resting between the reduced portion 27 of the piston 26 and the valve disc 28 holding the said piston and the valve disc in spaced relation to the cylinder head 11. These spring locks engage said valve assembly when the shut off valve is set by hand in the position shown in Figure 1.

Ports 38 are formed in the piston 26 and allow the passage of air therethrough under normal operation of the system from the air supply through the quick release valve to the brake diaphragms. The area of these ports are slightly larger than the space 25 surrounding the primary piston 18, the object of which will be apparent later on.

Figure 2:
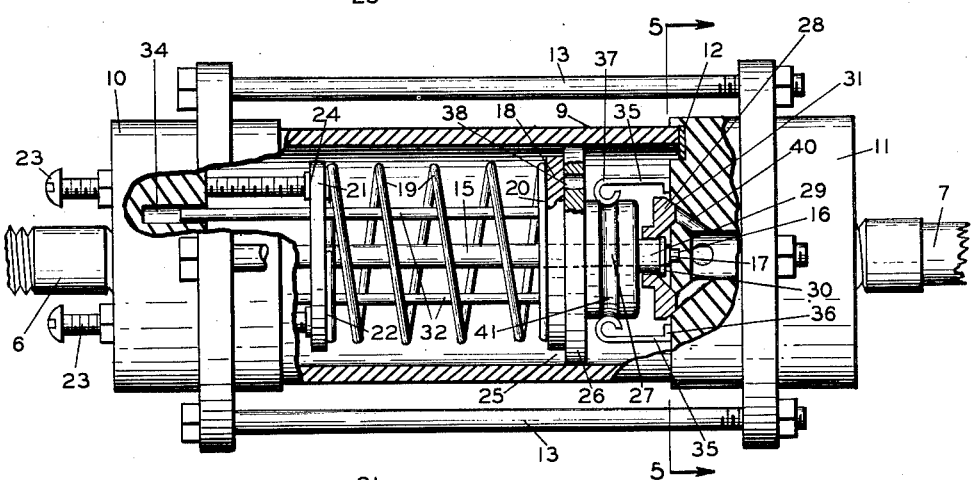
Figure 2 is a side view of the valve, partially broken away illustrating the shut off valve in closed or inoperative position, the position taken when a fracture occurs in the line leading to one of the brake diaphragms.
Figure 3:
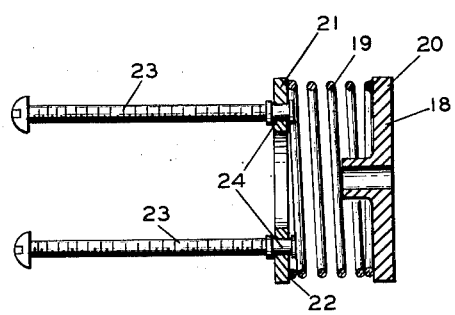
Figure 3 is a detail sectional view of the floating piston assembly.

We will now describe the operation of our improved safety shut off valve, referring to Figures 1, 2 and 8. Air is delivered into the quick release valve 3 through the line 4 from the operating valve not here shown. This air passes into our shut off valve through the inlet ports 39 by way of the connection 6 from the release valve 3 into the cylinder 9 escaping around the space 25 of the piston 18 and through the ports 38 of the secondary piston 26 out of the cylinder through the exit ports 40 into the air line 7 to the diaphragms of the brake system.

Under normal conditions the piston 18 will move to the right and this movement will be finally checked by a back pressure developed from the brake diaphragms building up on the forward side of the piston 18 within the cylinder 9. The amount that the piston 18 will move will be dependent upon the adjustment of the adjusting screws 23 and the resistance offered between the ring 21 through the spring 19 connected to the piston 18. The area within the cylinder 9 as related to the volume of air required to build up a back pressure from the brake diaphragms, together with the clearances 25 around the piston 18 and the adjustment of the tension of the spring 19 is so proportioned that the piston 18 will not reach the piston 26 in the normal application of the brakes. This is one of the outstanding features of our invention.

In the event of a fracture between our valve and the brake diaphragm there will be no back pressure or resistance built up within the cylinder 9 against the forward movement of the piston 18 by the application of air through the ports 39. Due to the lack of resistance, the piston 18 will overcome the resistance of the spring 19 until it reaches the piston 26 at which time it will close the ports 38, stopping the flow of air therethrough, and when this happens the piston 26 will be forced to the right seating the valve disc 28 on the seat 31, preventing the escape of air through the ports 40, referring to Figure 2.

When the piston 26 has been moved over closing the valve the ends 37 of the spring members 35 will engage the annular recess 41 of the reduced portion 27 of the valve 26 holding the valve closed as illustrated in Figure 2. In Figure 2 the position of the piston 18 is illustrated closing the valve and preventing the further escape of the air into the fractured line. When the brakes are released the piston 18 will resume the position illustrated in Figure 1 and at each application of the brakes from there on the remaining brake diaphragms will operate normally.

Referring back to column 3, lines 19 to 25 where the rods 32 are mentioned, we will now explain their purpose. When the brakes are released under normal conditions and the release valve 3, together with the operating valve, release the air from the brake discs, this air returns through the line 7 through the ports 40 of our valve, through the ports 38 of the piston 26 around the space 25 of the piston 18 and out through the ports 39, the line 6 and through the release valve. The movement of air under these conditions would positively force the piston 26 to the left and away from its locked position as illustrated in Figure 1 by way of the spring lock 35 which would be most undesirable, therefore the rods 32 working within the holes 34 of the head of the valve 10 prevents the piston 26 being carried to the left by the pressure of the released air from the diaphragms.

After the fracture has been repaired our safety valve is disassembled and the piston 26 is moved to the position shown in Figure 1 ready for further operation in the braking system.

What is claimed is:

1. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, and an independent floating piston spaced from the wall of said cylinder and movable to close the ports in the first piston and thereby cause valve closing movement of the latter.

2. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, and spring means resisting port closing movement of said floating piston.

3. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, and means to adjust the tension of said spring means.

4. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, an independent floating piston spaced from the wall of said cylinder and movable to close the ports in the first piston and thereby cause valve closing movement of the latter, and means to limit valve opening movement of said first piston.

5. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, and means to limit valve opening movement of said first piston.

6. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, means to adjust the tension of said spring means, and means to limit valve opening movement of said first piston.

7. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, and other spring means resisting closing of said valve when open and resisting opening of said valve when closed.

8. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, means to adjust the tension of said spring means, and other spring means resisting closing of said valve when open and resisting opening of said valve when closed.

9. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, means to limit valve opening movement of said first piston, and spring means resisting closing of said valve when open and resisting opening of said valve when closed.

10. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, means to limit valve opening movement of said first piston, and other spring means resisting closing of said valve when open and resisting opening of said valve, when closed.

11. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, spring means resisting port closing movement of said floating piston, means to adjust the tension of said spring means, means to limit valve opening movement of said first piston, and other spring means resisting closing of said valve when open and resisting opening of said valve when closed.

12. In an automatic safety shut-off valve, a cylinder having heads, one of said heads having an air inlet and the second head being provided with an air outlet terminating inwardly in a valve seat, a piston in said cylinder carrying a valve member facing said valve seat, said piston having ports therein, a floating piston spaced from the wall of said cylinder and movable to close the ports in the first piston and thereby cause valve closing movement of the latter, a ring in the cylinder adjacent the inlet head, screws passing through the inlet head and adjustably supporting said ring, a coiled tension spring connecting said floating piston and ring, a guide rod connecting said heads and having the floating piston slidably mounted thereon, and spring means locking said valve in closed position when closed.

EDWIN T. KALEN.
FRANK B. SCOFIELD.

REFERENCES CITED

The following references are of record in the file of this patent:

UNITED STATES PATENTS

| Number | Name | Date |
|---|---|---|
| 1,588,657 | Christensen | June 15, 1926 |
| 1,724,881 | Lund | Aug. 13, 1929 |
| 1,899,235 | De Pont | Feb. 28, 1933 |
| 2,141,688 | Eaton | Dec. 27, 1938 |